United States Patent Office 3,148,988
Patented Sept. 15, 1964

3,148,988
GROWTH PROMOTANT SUBSTANCES
Marvin Legator, Modesto, Calif., assignor to Shell Oil Company, New York, N.Y., a corporation of Delaware
No Drawing. Filed June 28, 1961, Ser. No. 120,186
12 Claims. (Cl. 99—2)

This invention relates to growth promotant substances for animals and more particularly to growth promotant substances which are of particular value in promoting the growth of domestic and farm animals. These growth promotant substances are especially useful for promoting the growth of livestock such as lambs, cattle, horses, and swine, as well as for promoting the growth of poultry such as chickens, turkeys and ducks.

In recent years a few substances have been found to have the property of promoting or stimulating animal growth, although these substances are apparently not a normal nutritional requirement of the animal. Perhaps the best established of these substances are certain growth stimulating antibiotics such as, for example, bacitracin, erythromycin, chloramphenicol or terramycin. In addition, as reported in the literautre in this field, there have been experimental indications that other non-nutritional substances, principally surfactants, under some conditions may also stimulate growth, although not to the extent of or as reliably as the aforementioned antibiotics. However, as the animal-raising art stands at present, only certain antibiotics have been accepted generally as additives to animal feeds, while surfactants have not been felt to be of sufficient value to justify their use in commercial feeding operations. In addition, it is known that certain antibiotics are responsible for the development of resistant organisms within the host animal and thus further complicate the animal's normal growth cycle. There is still a considerable need for more effective and less expensive animal growth promotants.

Since 1949 antimicrobial compounds, specifically antibiotics, have been evaluated as animal feed or animal nutrient supplements. The benefit derived from medicated feed include, for example, increased growth rate, increased efficiency in feed utilization, increased bloom and appearance of the animal (carcass grade), control of certain non-specific diseases (scours and enteritis), and reduction in the number of runts.

It is, therefore, a general object of this invention to provide animal feeds or animal nutrient materials containing novel growth promotant substances which compare favorably with the currently employed antibiotics both as to cost and results obtained.

A further general object is to provide animal feed or nutrient material containing these growth promotant substances which are, in many cases, superior to the antibiotics currently employed for this purpose and which will accomplish the above-indicated benefits derived from medicated feed.

A specific object is to provide growth stimulation in farm animals by introducing into the animal feed or nutrient material to be consumed by the animal, an active antimicrobial compound within the purview of this invention.

A still further specific object is the oral administration of antimicrobial compounds of the present invention to living animals in order to stimulate, accelerate or promote the growth of an animal.

Other objects and advantages will appear as the specification proceeds to those skilled in the art to which this invention pertains.

It has now been discovered that the above-indicated objects and benefits can be accomplished by providing as novel growth promotants alpha-halo, alpha-acyl alkanoates. More specifically, these growth promotants are alkyl-2-haloacetoacetates which are set forth in more detail as follows:

These alkyl 2-haloacetoacetates may be represented by the following structural formula:

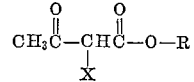

wherein R represents a branched or straight-chain alkyl group, a substituted (preferably substituted with a halogen atom or NO$_2$ group) alkyl group, a cycloalkyl group or a substituted cycloalkyl group. When R is a straight-chain or cycloalkyl group, it preferably contains 1 to 20 carbon atoms. X represents a halogen atom, preferably chlorine. Alkyl 2-haloacetoacetate esters, particularly contemplated by the present invention are the straight-chain alkyl esters wherein R represents a straight-chain alkyl of 1 to 10 carbon atoms. Representative haloacetate esters are, for example, methyl 2-chloroacetoacetate; ethyl 2-chloroacetoacetate; n-propyl 2-chloroacetoacetate; n-butyl 2-chloroacetoacetate; hexyl 2-chloroacetoacetate; heptyl 2-bromoacetoacetate; dodecyl 2-chloroacetoacetate; hexadecyl 2-chloroacetoacetate; eicosyl 2-bromoacetoacetate, and the like. Of special interest are the alkyl 2-chloroacetoacetates wherein R represents a straight-chain alkyl of 1 to 5 carbon atoms, e.g., methyl 2-chloroacetoacetate. Other alkyl 2-haloacetoacetates are the cycloalkyl esters such as, for example, cyclopropyl 2-chloroacetoacetate; cyclohexyl 2-chloroacetoacetate, and the like.

The haloacetoacetate esters of the present invention may be made by any of the methods commonly employed in the art. Thus, the chlorination of the appropriate acetoacetate esters yields the corresponding growth promotant, methyl 2-chloroacetoacetate. The fluoro and iodo compounds may also be synthesized employing known methods.

A representative growth promotant compound encompassed by the present invention which has shown a broad spectrum of in-vitro activity against certain bacteria is methyl 2-chloroacetoacetate. This compound is effective against bacteria at concentrations in the range of the currently employed antibiotics such as the tetracyclines and chloramphenicol. In addition to its in-vitro activity against certain bacteria, this compound has been evaluated in-vivo in living animals, e.g., lambs, and has shown growth stimulation equal or superior to the antibiotic standard employed. These growth promotant compounds are mixed with standard feed or where feasible added directly to the drinking water. The preferred alkyl 2-haloacetoacetates, as evidenced by tests in living animals, are the ($C_1$–$C_5$) alkyl 2-haloacetoacetates.

The following representative examples illustrate the growth promotant ability in farm animals of a typical compound within the purview of this invention. These examples more fully illustrate the invention by describing tests with animal feed or nutrient material characterized by containing as an essential active ingredient therein at least one compound from the class of alkyl 2-haloacetoacetates encompassed by this invention.

EXAMPLE I

*Four-Week, Six-Week, Eight-Week Growth Promotant Results in Lambs*

Table I illustrates growth stimulation in lambs with a typical compound of the present invention, i.e., methyl 2-chloroacetoacetate. This growth stimulant was orally administered to the lambs by mixing the promotant with the feed. Ten lambs were used per treatment with the exception of the check and the aureomycin standard where eight lambs were used. The lambs at the start of the test weighed about 80 pounds each and were from about 4 to about 5 months old.

TABLE I

| Compound | Quantity Per Lamb Per Day in Feed, mg. | Lb. Gain Per Animal Per Day at— | | | Pounds Feed Consumed Per Pound Gain (Feed Conversion Ratio) |
|---|---|---|---|---|---|
| | | 4 Wks. | 6 Wks. | 8 Wks. | |
| Methyl 2-chloroacetoacetate | 50 | .40 | .37 | .40 | 10.6 |
| Aureomycin | 25 | .43 | .39 | .37 | 11.4 |
| Check | | .21 | .26 | .29 | 12.0 |

It can be seen from Table I that the weight gain per animal was fairly constant for the eight-week period. This is in contrast to aureomycin where the weight gain decreased after the first four weeks.

Methyl 2-chloroacetoacetate, although somewhat inferior to aureomycin at the four-week weighing, was slightly better in weight gain and feed conversion when the test was terminated.

There were no appreciable differences in the grade of the carcasses from any of the treatments, and all appeared slightly better than the checks. From Table I it can be seen that the test material was equal or superior to the aureomycin standard in both weight gain and feed conversion ratio.

EXAMPLE II

*Sixty-Day Growth Promotant Results in Lambs*

This example is to show the results of tests with lambs using methyl 2-chloroacetoacetate as growth promotant. Methyl 2-chloroacetoacetate was blended into a standard feed and fed throughout a sixty-day test period at a dosage of 100 mg. per lamb per day. Aureomycin was the standard at 25 mg. per lamb per day. Ten feeder lambs weighing about 80 pounds each were used for each treatment.

Methyl 2-chloroacetoacetate at 100 mg. per lamb per day gave a 25% improvement over the control.

In practicing this invention, the growth promotant substances described herein are orally administered to the growing animal. It is relatively easy to practice the invention by incorporating the compounds in any suitable animal feed or nutrient material which will be consumed by the animal or, if possible, by adding it directly to the animal's drinking water. In this way, it has been found possible to increase the weight gain and feed conversion ratio in animals, as shown herein.

The feed or nutrient material used in the above examples consisted essentially of alfalfa, barley and molasses with an analysis of about 70, 20 and 10%, respectively. But any suitable animal feed or nutrient material, solid or liquid, may carry the growth promotant substance and the above feed material is exemplary only. In preparing the solid feed material containing the growth promotant, the growth promotant may be intimately mixed or blended with the feed material to produce a premix. An appropriate amount of this premix may then be distributed throughout the entire feed in a feed mixer or blender. Alternatively, the growth promotant substance can be dissolved in a suitable solvent such as, for example, ethanol, and the solubilized material mixed with the solid feed, or if a liquid, the growth promotant substance can be mixed with the dry feed to form a mash.

The range of effectiveness of the growth promotant substances of this invention depends upon the age and species of the animal being fed. Experiments have shown response from 50 mg. to 100 mg. per animal per day, an especially favorable range for growing lambs. However, greater or lesser amounts of these growth promotants can be employed with considerable success with a range of from about 5 mg. to about 300 mg. per animal per day as satisfactory. In the compositions of this invention, that is, those compositions containing an animal feed, nutrient material or water in combination may contain from about .0038% to about .0076% of growth promotant with a range of from about .00038% to about .0228% being most preferred. (Based on an 80 lb. fattening lamb consuming 2.9 lbs. per day.)

The growth promotant substances described herein not only speed up the growth of the animal but also improve the efficiency of feed conversion. This is an important advantage, since it makes the growing process more economical for animal raisers by requiring less feed per pound of weight gain. In addition, these growth promotant substances can be combined with the antibiotics now in use in order to reduce the amount of the more expensive antibiotics needed possibly to minimize the danger of the development of a resistant flora, and the use of a material that is not currently employed in clinical medicine.

While in the foregoing specification, this invention has been described in relation to certain specific embodiments thereof and many details have been set forth for purpose of illustration, it will be apparent to those skilled in the art that the invention is susceptible to other embodiments than those set forth and that many of the specific details can be varied widely without departing from the basic concepts of the invention.

I claim as my invention:

1. A composition for promoting the growth of animals comprising as the essential active ingredient therein from about .00038% to about .0228% of a ($C_1$–$C_{20}$) alkyl 2-haloacetoacetate, wherein the halo moiety is selected from the group consisting of chloro and bromo, in admixture with an animal feed.

2. A composition for promoting the growth of animals comprising as the essential active ingredient therein from about .00038% to about .0228% of a ($C_1$–$C_{10}$) alkyl 2-haloacetoacetate, wherein the halo moiety is selected from the group consisting of chloro and bromo, in admixture with an animal feed.

3. A composition for promoting the growth of animals comprising as the essential active ingredient therein from about .00038% to about .0228% of a ($C_1$–$C_{10}$) alkyl 2-chloroacetoacetate, in admixture with an animal feed.

4. A composition for promoting the growth of animals comprising as the essential active ingredient therein from about .00038% to about .0228% of a ($C_1$–$C_5$) alkyl 2-chloroacetoacetate, in admixture with an animal feed.

5. A composition for promoting the growth of animals comprising as the essential active ingredient therein from about .00038% to about .0228% of a methyl 2 - haloacetoacetate, wherein the halo moiety is selected from the group consisting of chloro and bromo, in admixture with an animal feed.

6. A composition for promoting the growth of animals comprising as the essential active ingredient therein from about .00038% to about .0228% of methyl 2-chloroacetoacetate, in admixture with an animal feed.

7. A method for promoting the growth of animals comprising orally administering to said animals about 5–300 mg. per animal per day of a ($C_1$–$C_{20}$) alkyl 2-haloacetoacetate, wherein the halo moiety is selected from the group consisting of chloro and bromo.

8. A method for promoting the growth of animals comprising orally administering to said animals about 5–300 mg. per animal per day of a ($C_1$–$C_{10}$) alkyl 2-haloacetoacetate, wherein the halo moiety is selected from the group consisting of chloro and bromo.

9. A method for promoting the growth of animals comprising orally administering to said animals about 5–300 mg. per animal per day of a ($C_1$–$C_{10}$) alkyl 2-chloroacetoacetate.

10. A method for promoting the growth of animals comprising orally administering to said animals about 5–300 mg. per animal per day of a ($C_1$–$C_5$) alkyl 2-chloroacetoacetate.

11. A method for promoting the growth of animals comprising orally administering to said animals about 5–300 mg. per animal per day of a methyl 2-haloacetoacetate, wherein the halo moiety is selected from the group consisting of chloro and bromo.

12. A method for promoting the growth of animals comprising orally administering to said animals about 5–300 mg. per animal per day of methyl 2-chloroacetoacetate.

References Cited in the file of this patent

UNITED STATES PATENTS

| | | |
|---|---|---|
| 2,900,304 | Martin | Aug. 18, 1959 |
| 2,910,360 | De Zeeuw et al. | Oct. 27, 1959 |

OTHER REFERENCES

Chem. Abst., vol. 43 (1949), 9334g.